United States Patent
Hou et al.

(10) Patent No.: US 7,900,116 B2
(45) Date of Patent: Mar. 1, 2011

(54) SWITCH WITH ERROR CHECKING AND CORRECTING

(75) Inventors: Cheng-Liang Hou, HsinChu (TW); Jiann-Jyh Lay, Kaohsinng (TW)

(73) Assignee: Broadcom Corporation, Irvine, CA (US)

( * ) Notice: Subject to any disclaimer, the term of this patent is extended or adjusted under 35 U.S.C. 154(b) by 1076 days.

(21) Appl. No.: 11/647,424

(22) Filed: Dec. 29, 2006

(65) Prior Publication Data

US 2008/0034267 A1     Feb. 7, 2008

Related U.S. Application Data

(60) Provisional application No. 60/835,867, filed on Aug. 7, 2006.

(51) Int. Cl.
*H03M 13/00*     (2006.01)
(52) U.S. Cl. .................... 714/752; 714/757; 714/784
(58) Field of Classification Search .............. 714/752, 714/20, 757, 784, 751, 776
See application file for complete search history.

(56) References Cited

U.S. PATENT DOCUMENTS

| | | | |
|---|---|---|---|
| 5,557,621 A * | 9/1996 | Nakano et al. | 714/784 |
| 6,646,582 B2 * | 11/2003 | Watanabe | 341/143 |
| 6,798,740 B1 * | 9/2004 | Senevirathne et al. | 370/219 |
| 6,895,528 B2 * | 5/2005 | Cantwell et al. | 714/12 |
| 7,031,535 B2 * | 4/2006 | Yamamoto | 382/240 |
| 7,596,139 B2 * | 9/2009 | Patel et al. | 370/392 |

* cited by examiner

*Primary Examiner*—Fritz Alphonse
(74) *Attorney, Agent, or Firm*—Sterne, Kessler, Goldstein & Fox P.L.L.C.

(57) ABSTRACT

Data error often occurs during the process of data transmission or storage. Typically, a store-and-forward data switch uses the frame check sequence portion of a data frame to detect for error that occurred during transit to the switch. However, error could be introduced into the data frame when it is in the memory of the data switch. A network switch capable of single-error correction and double-error detection is provided to further protect the data frame while it is in the switch.

29 Claims, 9 Drawing Sheets

|  | Col. 1 | 2 | 3 | 4 | Col. Parity |
|---|---|---|---|---|---|
| Row 1 | 1 | 1 | 0 | 0 | 0 |
| 2 | 1 | 0 | 1 | 0 | 0 |
| 3 | 0 | 1 | 1 | 1 | 1 |
| 4 | 1 | 0 | 0 | 0 | 1 |
| 5 | 0 | 1 | 0 | 1 | 0 |
| Row Parity | 1 | 1 | 0 | 0 | |

FIG. 6

SWITCH WITH ERROR CHECKING AND CORRECTING

CROSS REFERENCE TO RELATED APPLICATIONS

This application claims the benefit of U.S. Provisional Application No. 60/835,867 filed Aug. 7, 2006, which is incorporated herein by reference in its entirety.

FIELD OF THE INVENTION

The present invention relates generally to a switch. Specifically, the invention relates to a network switch capable of error checking and correcting.

BACKGROUND OF THE INVENTION

Data transmission and storage are important functional aspects of any computer systems. In order for a computer system to reliably function, the storage and transmission of data must be done in a reliable manner such that the data integrity is not comprised. Within a computer system, data are constantly being stored and transmitted between, for example, memory devices and the central processing unit (CPU). When data are stored, errors may occur within a memory device due to inherent memory defects or random noise within the memory device. When data are transmitted, errors may be introduced into the data stream due to noise in the communication channel or from external interferences such as crosstalk.

Data error in the memory device may cause the memory device to fail from what is called bit error. Other errors may also occur such as burst error. These errors often cause a computer system to fail from memory failure. To reduce the rate of memory failure in a computer system, memory with error checking and correcting (ECC) is typically employed.

Memory with ECC protection enables the computer system to check whether the data being received contain any error. Data may be received from other computer systems or from a memory device via a bus within the computer system. ECC enables the computer system to verify whether the data received are the same as the data that were previously transmitted or stored. When an error is detected, the computer system may request for the re-transmission of the data and/or discard the data.

In a computer network, data are also being constantly transferred between computer systems in the network. In every network, whether it is a local area network (LAN), a wide area network (WAN), or the internet, data are being transferred from one computer system to another using various types of switches such as a layer 2 switch or a layer 3 router. As mentioned, errors typically occur during data transmission or storage. Accordingly, it is desirable to have a switch capable of reducing errors caused by data transmission and storage.

BRIEF DESCRIPTION OF THE DRAWINGS/FIGURES

The present invention is described with reference to the accompanying drawings.

FIG. 6 illustrates a block diagram of a error correction code algorithm.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described. An embodiment of the present invention is now described. While specific methods and configurations are discussed, it should be understood that this is done for illustration purposes only. A person skilled in the art will recognize that other configurations and procedures may be used without departing from the spirit and scope of the invention.

Figure 1:
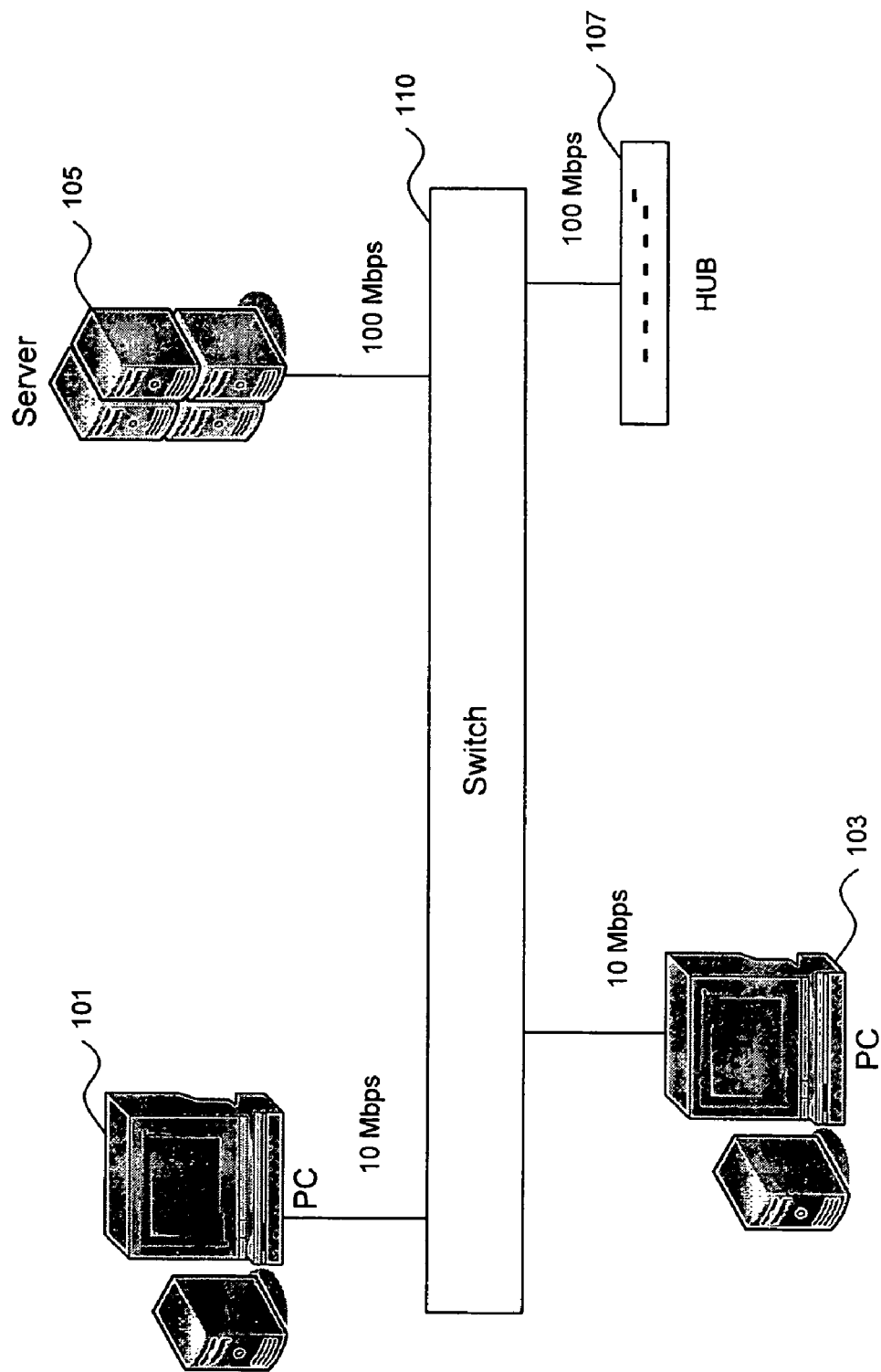
FIG. 1 illustrates an exemplary computer network.

FIG. 1 illustrates an exemplary network 100 that includes personal computers 101 and 103, a server 105, a data hub 107, and a switch 110. Switch 110 enables computer 101 to communicate with computer 103, server 105, or hub 107. Switch 110 also enables computer 103, server 105, and hub 107 to communicate with any other computer systems connected to the switch. Although not shown, computers 101 and 103, server 105, or hub 107 can be connected to other network systems such as LAN, WAN, or the internet.

On a high level, when data is received by switch 110 from computer 101, the data is examined to determine the data's destination address. Once the destination address and sending instructions are extracted, switch 110 makes a decision on where to send the received data. For example, computer 101 may want to send data only to server 105. In such a case, switch 110 will forward data received from computer 101 to server 105. In another example, computer 101 may want to send data to computer 103 and server 105, in this scenario, switch 110 will forward data transmitted by computer 101 to both the computer 103 and server 105.

It should be noted that there are various types of switching devices. Each type of switching devices is specifically design to function at a particular OSI layer. At layer 1, these switching devices are called hubs or repeaters. The main function of a hub or a repeater is to broadcast incoming data to one or more ports or spokes of the hub. In addition to data broadcasting, the repeater also amplifies the original signal for re-transmission.

At layer 2, the switching device is often called a multiport bridge or more commonly as a switch. Switches are designed to forward data based on a physical address known as media access controller (MAC) address embedded in the header of a data frame. Each network interface card (NIC) of a computer system or a switch has a unique 48-bit long MAC address that may look like "2E 1D AC 01 00 01." Using the MAC address, a switch is able to route data to other switches or to a computer system with a matching MAC addresses.

A layer 3 switching device is called a router. Routers forward data packages based on their destination network address or internet protocol (IP) address. Similar to layer 2 switches, layer 3 routers are capable of learning addresses and maintaining address tables for referencing data packages with corresponding destinations.

Figure 2:
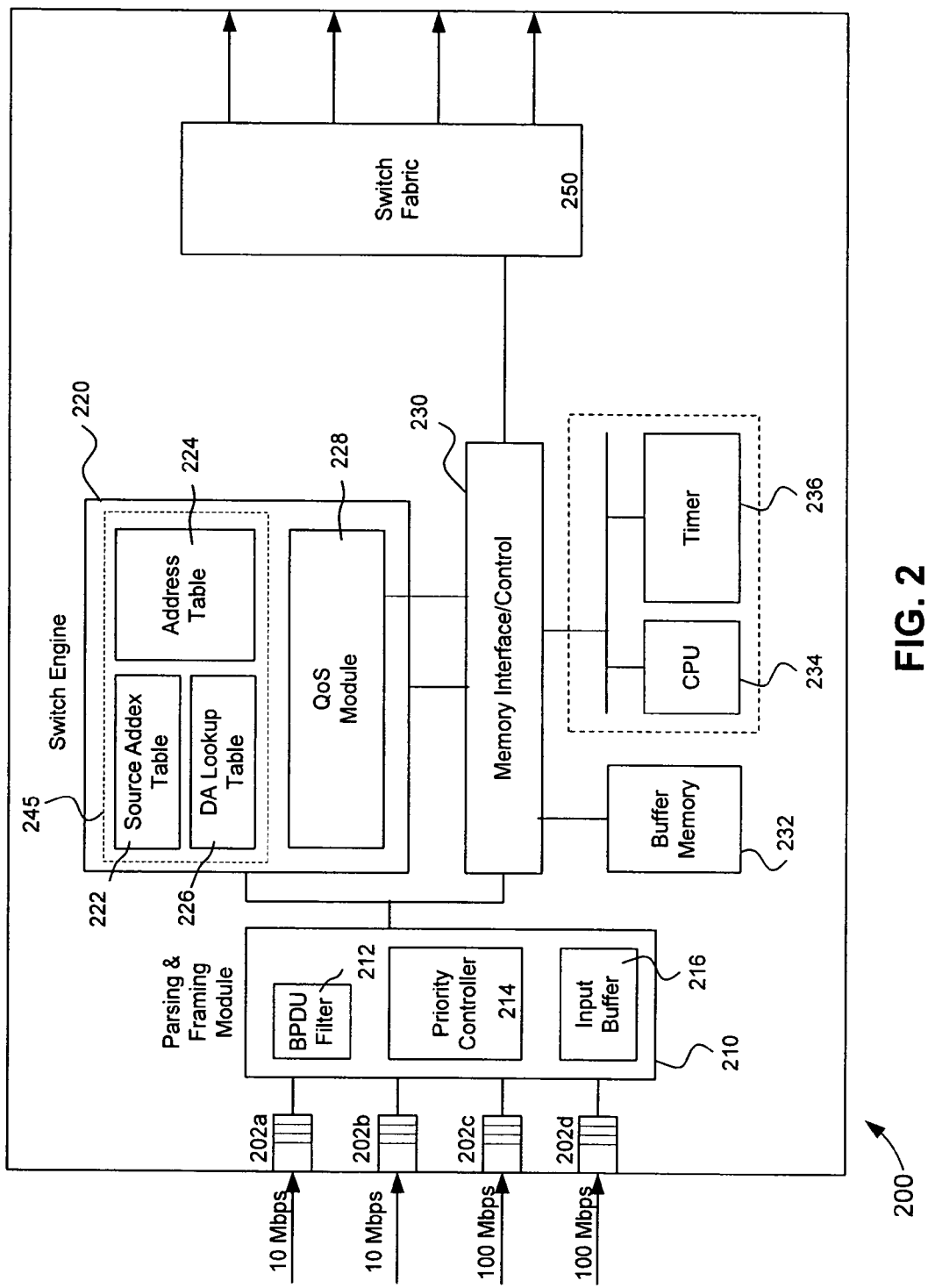
FIG. 2 illustrates a block circuit diagram of an exemplary switch.

FIG. 2 illustrates an exemplary layer 2 switch 200. Switch 200 includes input ports 202a-d, a parsing and framing module 210, a switch engine 220, a memory interface 230, a memory 232, an address lookup & routing module 245 (routing module), a central processing unit (CPU) 234, a timer 236, and a switch fabric 250. In switch 200, data are received by input ports 202a-d. Data transmitted to input ports 202a-d are received by input buffer 216.

Parsing and framing module 210 includes a bridge protocol data unit (BPDU) filter 212 and a priority controller 214 for prioritizing data contained in input buffer 216. BPDU filter is used to prevent data looping. Data looping is a phenomenon where data continuously loop around the network looking for a particular MAC address. BPDU filter is implemented using anti data-looping algorithm such as the spanning tree protocol (STP) and algorithm, documented in IEEE 802.1D. BPDU filter may be configured to be active for all input ports or any number of selected port. Alternatively, BDPU filter may be inactive.

Figure 3:
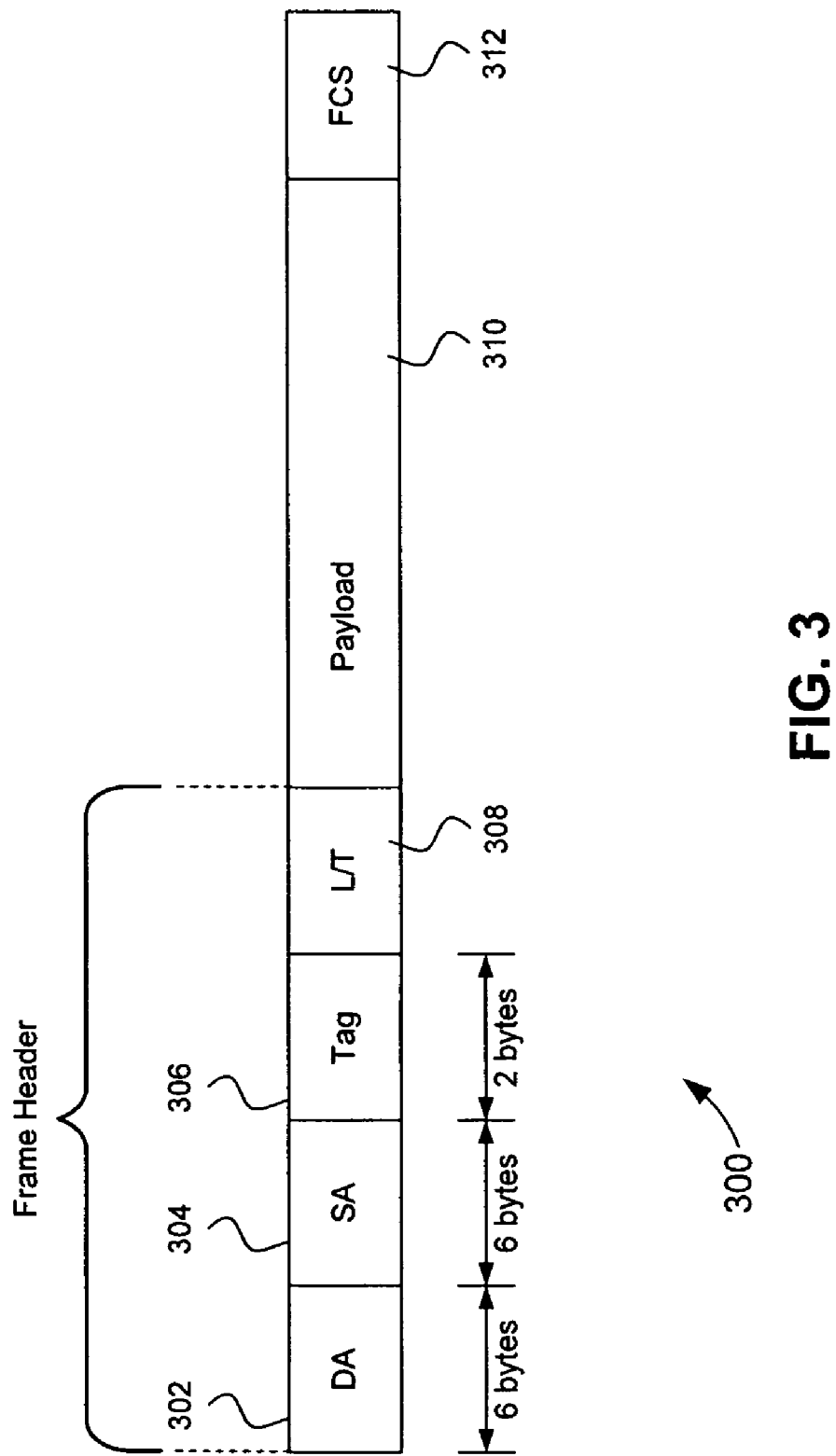
FIG. 3 illustrates a block diagram of a data frame.

In parsing and framing module 210, a data frame is spliced or duplicated and forwarded to various portions of switch 200. To better understand which portion of a data frame goes to which circuit portions of switch 200, let us examine the anatomy of a data frame. As illustrated in FIG. 3, a data frame 300 typically comprises a preamble portion (not shown), a destination address (DA) portion 302, a source address (SA) portion 304, a tag portion 306, a length and type designation portion 308, a payload portion 310, and a frame check sequence (FCS) portion 312. The preamble portion is used to indicate the beginning of a data frame. In certain communication standards, the preamble portion is optional as frame check sequence 312 may be used to indicate the end of a frame, hence the beginning of the next frame can be determined.

In frame 300, each of the source address and destination address portions is 48-bit long (6 bytes). Source address portion 304 contains the MAC address where data came from. Destination address portion 302 contains the MAC address where data are meant to be forwarded to. The length/type portion 308 is 16 bits long. Length/type portion 308 may be used to indicate the length of the valid data in payload portion 310. Portion 308 could also be used to indicate the protocol used by the data frame. These four portions (SA, DA, tag and length) of the frame 300 are typically referred to as the header portion 320. Payload portion 310 contains the actual data, which can range from 46 to 1500 bytes. Finally, the frame check sequence portion 312 contains frame error checking code such as a parity code or a cyclic redundancy check code that enables the switch to determine whether an error has occurred in the data frame during the transmission of the data frame.

Each portion of header 320 is extracted by switch engine 220 for processing. Source address portion 304 is forwarded to routing module 245, which includes a source address lookup module 222, an address table 224, and a destination address table 226. Source address lookup module 222 matches the source address in portion 304 with an address contained in address table 224. If a match is found, the source address is used to query for the destination address using the destination address lookup table 226. If a match is not found in address table 224, source address lookup module 222 enters a learning mode. In learning mode, switch engine 200 broadcasts the received frame to all ports and listens for a receipt confirmation from a correct destination port(s). Once the confirmation is received from the correct port, address table 224 learns the connection and updates the table such that the proper port number or address corresponds with the destination address in header 320.

In an exemplary implementation, address table 224 is a hash address table. A hash address table is usually implemented in a high-speed and high-traffic switch. Unlike a deterministic address table where the load balance of output channels is not monitored or determinative, a hash table employs a load-balancing algorithm to alleviate data congestion by spreading data traffic across various output channels such that the load across the output channels are balanced.

After hashing is done on the source address, switch engine 220 may be configured to either forward the data frame to a port address immediately or error checking can be performed on the data frame. Whether or not error checking is performed depends on the mode of switching switch 200 is on. There are several modes of switching, cut-through switching, adaptive cut-through switching, and store-and-forward switching. In cut-through switching, a header of the data frame is forwarded as soon as the destination address is received and a port address is determined. The rest of the data frame (i.e. the payload portion) follows the same route path as the header of the data frame. This is done regardless of whether errors exist in the data frame. In a cut-through system, the responsibility of error checking is placed on the receiving end. If an error is detected in the data frame at the receiving end, re-transmission of the data frame may be requested.

In store-and-forward switching, an entire data frame is stored into memory and then scanned for errors. This is done using the frame check sequence (FCS) portion of the data frame. In adaptive cut-through switching, a switch engine operates in cut-through mode but monitors the amount of errors it sees. If the switch engine records an excessive amount of errors, the switch may switch over to the store-and-forward switching mode.

Switch engine 220 further includes a quality of service (QoS) module 228. Once switch engine 220 receives a data frame (i.e. data frame 300), QoS module 228 recalculates the FCS value of the data frame and compares the calculated FCS value with the FCS value found in FCS portion (i.e. FCS portion 312) of the data frame. If the calculated FCS value does not match with the FCS value found in the data frame, then QoS module 228 may discard the entire frame. Various algorithms such as parity check, block check character (BCC), checksum, and cyclic redundancy check (CRC) could be employed to detect errors and to generate the FCS value for a data frame. Among the algorithms mentioned, CRC is the most popular.

On a high level, CRC treats data in a data frame as a continuous block of bits. The block is then divided by a special CRC generated divisor to yield the FCS value. At the receiver side (in this case the switch engine), the data frame block is divided by the FCS value to yield a quotient and a remainder. If the remainder is zero then there is no error; otherwise, the data frame has one or more errors. Implementation of CRC is well known in the art.

In addition to error checking, QoS module 228 also performs a data frame size check. For example, if payload portion 310 of a data frame is less than 46 bytes or more than 1500 bytes, the data frame may be discarded. In certain switching application, a frame-padding procedure may be employed to pad payload portion 310 when it is less than 48 bytes.

In switch 200, the flow of data in and out of memory interface 230 and buffer memory 232 are controlled by CPU 234 and timer 236. Data frames received from ports 202a-d are temporarily stored in buffer memory 232 until switch engine 220 finishes processing header information from those data frames. As mentioned, a data frame could be discarded by switch engine 220 for several reasons such as FCS error and excessive frame size. In the event of an error, the entire data frame is discarded. If there is no error, data frames are passed to switch fabric 240 for routing.

Figure 4:
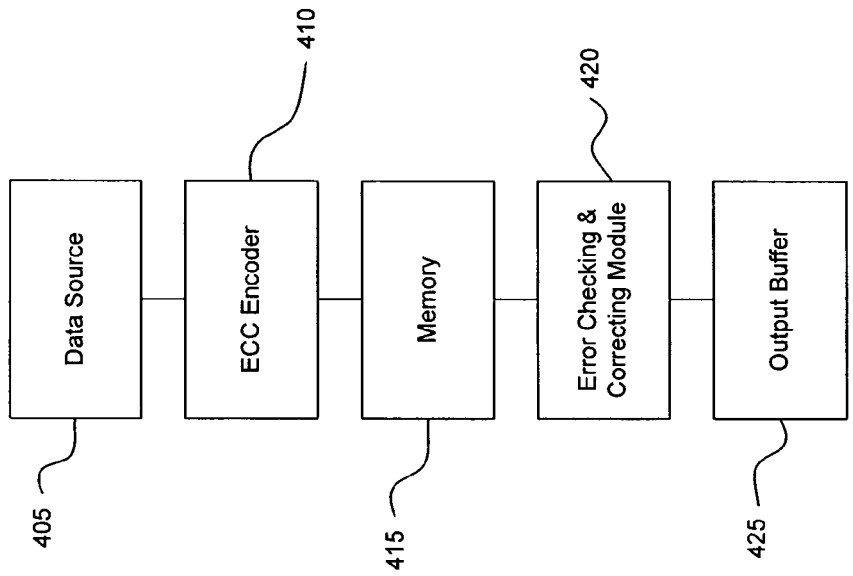
FIG. 4 illustrates an exemplary process flow of error checking and correcting.

As mentioned, errors typically occur during the transmission or storage of the data. To minimize errors from data storage anomaly, data may be encoded using ECC encoder prior to the storage of the data. FIG. 4 illustrates an exemplary data protection process using an ECC code. As illustrated in FIG. 4, data received in step 405 are forwarded to an ECC encoder. In step 410, data is encoded using various types of ECC codes such as parity check code, hamming code, or Reed-Solomon code. In step 415, the newly encoded data is stored. In step 420, data is read out of the memory along with the ECC code. If the read out data does not match with the ECC code embedded therein, the data will be flagged as corrupt. In step 425, non-corrupted data is forwarded to an output port and corrupted data will be discarded.

Figure 5:
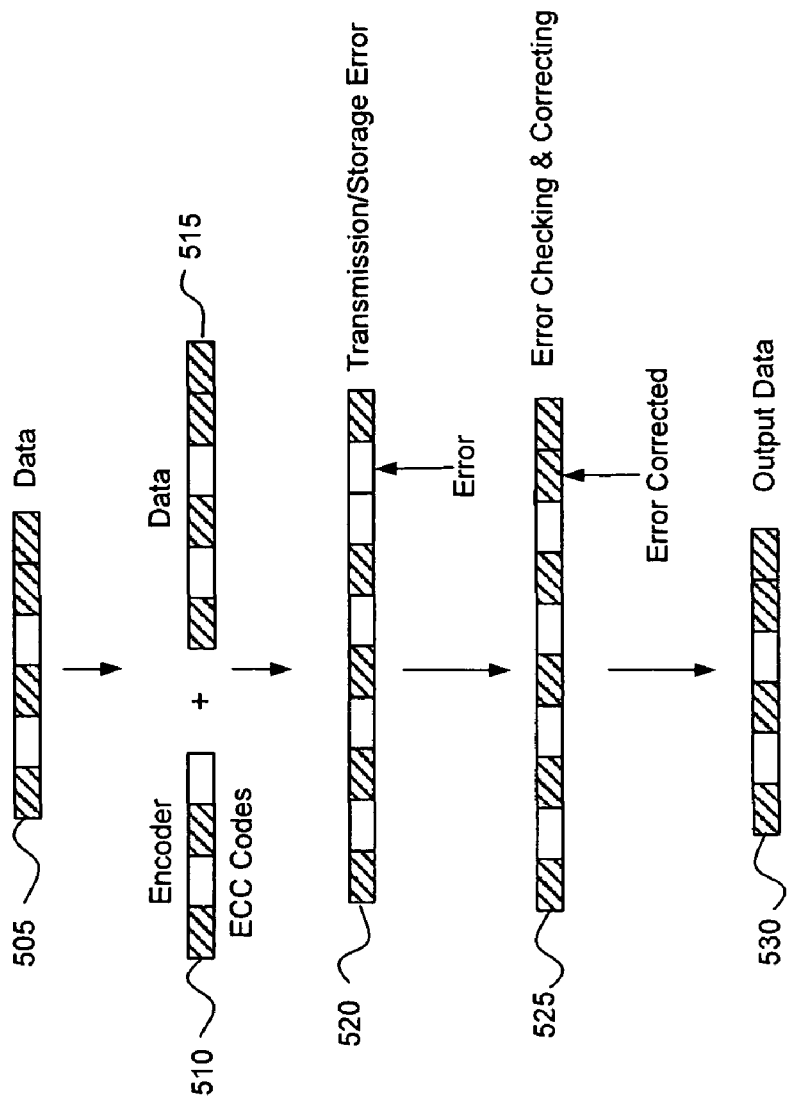
FIG. 5 illustrates a bit diagram of a data frame as being implemented according to the error checking and correcting process in FIG. 4.

FIG. 5 illustrates the ECC encoding process for a given data frame. In step 505, a data frame is received. In step 510, an ECC code is generated for the received data frame. In step 515, the ECC code and the data frame is concatenated. In step 520, during data storage, an error occurs at the second to the last bit on the right. In step 525, data is read out of the memory and processed against the ECC code embedded thereon. If an error is detected, the data frame may be discarded or the bit error may be corrected as illustrated in step 525. Whether or not the bit error may be corrected depends on the ECC code being used. In step 530, the corrected data is outputted.

As mentioned, there are several types of ECC codes such as parity-check code and hamming code. FIG. 6 illustrates an exemplary parity-check code for a given data contained in a memory. As shown in FIG. 6, a parity code is generated for every row and column of data. Once the parity code is generated, it can be used to check whether an error has occurred in any of the boxes of the memory matrix. The parity-check code is one of the simplest ECC codes. For a given data in a row or column, a parity code of 0 or 1 is generated. A parity code of 1 is generated if the number of bits containing the bit 1 is an odd number. A parity code of 0 is generated if the number of bits containing the bit 0 is an even number. For example, in row 1, with the data being "1 1 0 0," the parity code is 0. If for example, the last bit got changed into a 1 due to an internal memory error, the parity check bit of 0 would indicate that an error has occurred since the total number of 1 bit is 3 instead of 0, 2, or 4.

Parity-check code is easy to implement; however, due to its simplicity, it can only be used to detect a single bit error. Correction of a single bit error using parity-check code is not possible. However, in sophisticated memory systems, other ECC codes with single-error correction (SEC) and double-error detection (DED) capability could be used. One such codes is hamming code (7,4) or any other type of hamming code with at least a hamming distance of 4.

In switch 200, error checking is performed on incoming data frames by QoS module 228. However, QoS module 228 can only detect errors that occurred during the data transmission from some source to switch 200. QoS module 228 may not detect errors that occurred inside switch 200 (once a data frame is received by the input buffer). For example, a data frame could become corrupted once it is inside of memory controller 230 or buffer memory 232 while waiting for instructions from switch engine 200 or waiting to be queued. QoS module 228 may not guarantee that data coming out of buffer memory 232 is error free. For example, even if a data frame passes the FCS test and frame size test conducted by QoS module 228, the data frame can become corrupted by noise within memory interface 230 and buffer memory 232. Switch 200 is not constructed to detect errors occurring within the switch. As a consequence, data being switched or routed by switch 200 may be corrupted. Further, errors that occur within memory 232 could cause switch 200 to fail entirely from memory failure.

Figure 7:
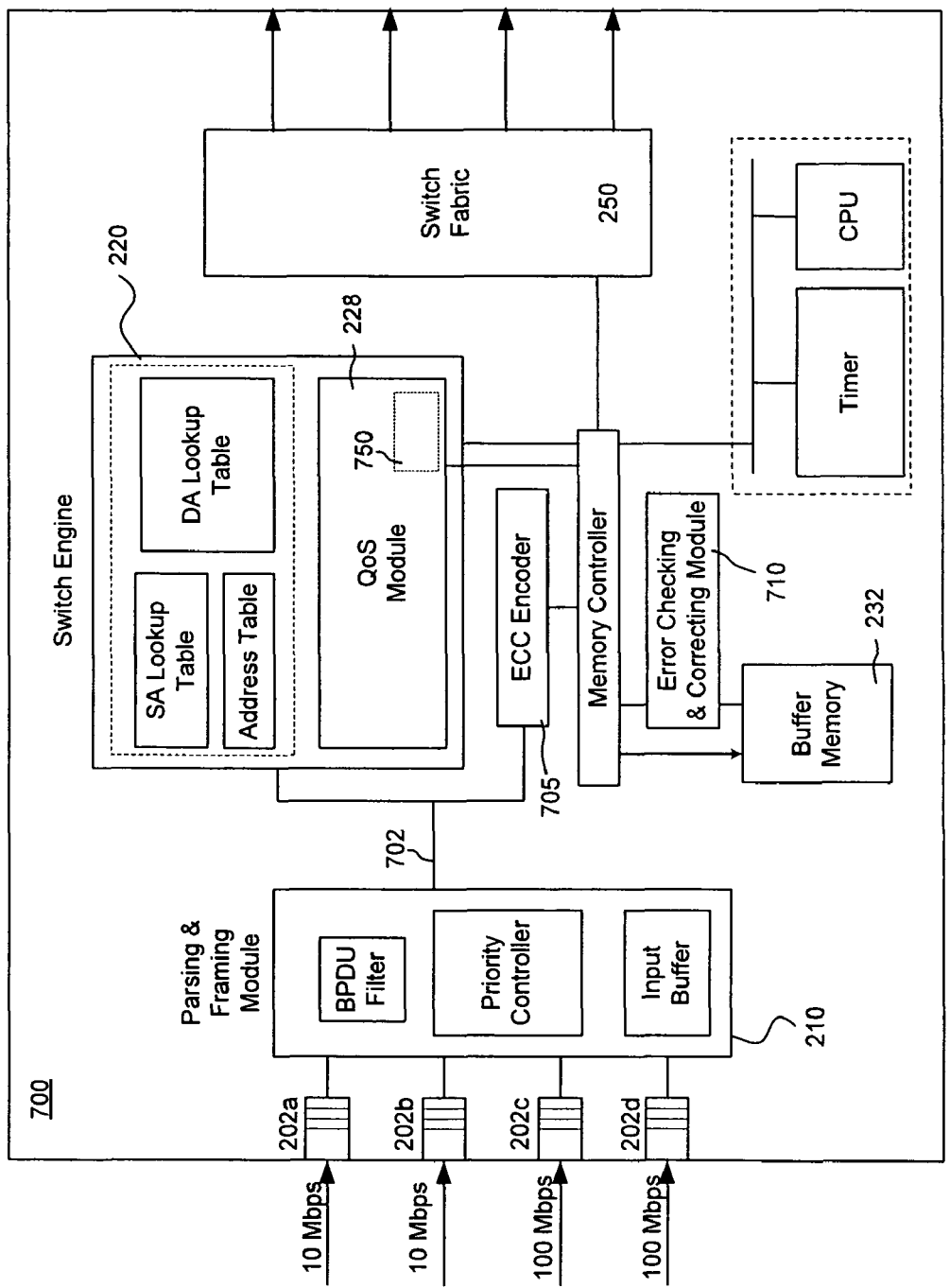
FIG. 7 illustrates a block circuit diagram of a switch according to an embodiment of the present invention.

FIG. 7 illustrates a switch 700 with error checking and correcting (ECC) protection according to an embodiment of the invention. Switch 700 is similar to switch 200 but further includes an ECC encoder 705 and an ECC module 710. Switch 700 has a two-tier error checking system. The first error checking tier is done by ECC encoder 705 and ECC module 710. The second error checking tier is done by QoS module 228. The first error checking tier is designed to catch errors that may occur inside memory 232. The second error checking tier is designed to catch errors that may occur while a data frame (e.g. data frame 702) is in transit to switch 700.

As shown in FIG. 7, the first error checking tier includes encoder 705 and ECC module 710. Encoder 705 encodes incoming data frames 702 from input ports 202a-d and framing module 210. ECC encoder 705 encodes data frame 702 with an ECC code such as parity check code, hamming code, or Reed-Solomon code. In an embodiment, encoder 705 encodes data frame 702 with parity-check code. In an alternative embodiment, encoder 705 encodes data frame 702 with a SEC-DED (single-error correcting and double-error detecting) capable code such as a hamming code with a hamming distance of 4 or more. Once data frame 702 is encoded, it is forwarded to memory 232.

When data frame 702 is ready to be read out of memory 232, ECC module 710 extracts the ECC code embedded in data frame 702 and checks for any error that may have occurred while data frame 702 was stored in memory 232. If ECC module 710 detects an error, data frame 702 is discarded. In an alternative embodiment, if a single bit error is detected, ECC module 710 uses the ECC code to correct the bit error and reconstruct the original data frame. Once the correction is made, the corrected data frame is forwarded for further processing. If more than one error is detected, ECC module 710 discards data frame 702.

The second error checking tier involves QoS module 228 which is configured to analyze data frame 702 by reading it from memory 232. QoS module 228 analyzes data frame 702 for errors that may have occurred during transmission by calculating an error code for the entire data frame 702 and compared with the error code embedded in the FCS portion of data frame 702. If the comparison does not yield matching codes, then one or more errors have occurred in data frame 702. Any data frame with an error is then discarded. Only data frames without error are forwarded to switch fabric 250.

Alternatively, QoS module 228 can be configured to analyze data frame 702 directly from input buffer 216. In this manner, QoS module 228 can perform FCS analysis on data frame 702 before it is encoded by ECC encoder 705. If QoS module 228 detects an error, data frame 702 is discarded. In this way, the two error checking tiers are performed in reverse order.

Alternatively, ECC encoder 705 and ECC module 710 may be disabled and only QoS module 228 is enabled. In this embodiment, the QoS module 228 is configured to analyze data frame 702 directly from input buffer 216. Additionally, QoS module 228 may include an error check and correcting module 750. ECC module 750 is similar to ECC module 710. ECC module 750 checks for any pre-existing ECC code embedded in the incoming data frame 702. If data frame 702 contains a pre-existing ECC code then ECC module 750 checks for any error that may have occurred while data frame 702 was in transit to switch 700. If ECC module 750 detects a bit error, data frame 702 is discarded. If there is no error, QoS module 228 allows tables 224, 226, and 228 to proceed with the address lookup and routing process. Additionally, for a valid (error free) data frame, tables 224, 226, and 228 may mark the lookup entry (e.g. the data frame header), as a valid entry. This allows each table to quickly determine whether the lookup and routing process should be continued or abandoned.

In an alternative embodiment, if a single bit error is detected, ECC module 750 uses the ECC code to correct the bit error and reconstruct the original data frame. Once the correction is made, the corrected data frame may be processed by tables 224, 226, and 228 to determine the data frame routing path. Again, after the data frame is reconstructed using the ECC dode, tables 224, 226, and 228 may mark the lookup entry as a valid entry. If more than one error is detected (e.g. a 2 bit error), ECC module 750 discards data frame 702. In this situation, tables 224, 226, and 228 may mark the entry as an invalid entry and abandon the lookup process. QoS module 228 may additionally cause switch engine 220 to ignore all incoming data packets relating to the invalid entry and/or data frame.

In an embodiment, switch 700 operates as an adaptive cut-though switch. In adaptive cut-through mode, switch 700 operates in cut-through mode but monitors the amount of errors it sees. If switch 700 observes an excessive amount of errors, switch 700 may switch over to the store-and-forward switching mode.

Figure 8:
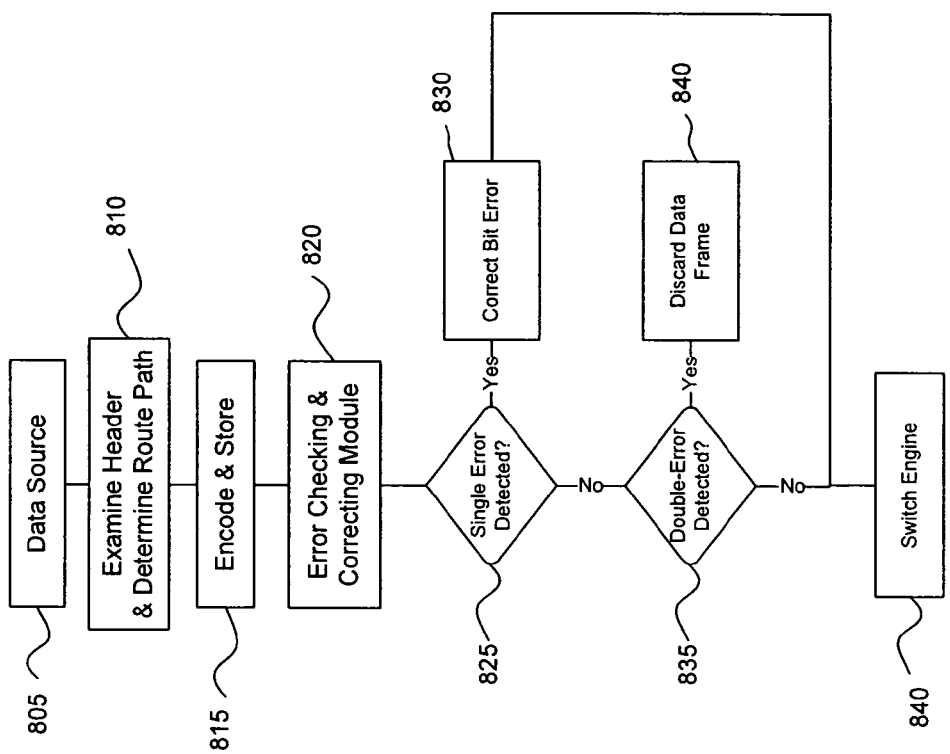
FIG. 8 illustrates a process flow diagram according to an embodiment of the present invention.

FIG. 8 illustrates the process flow according to an embodiment of the present invention. In step 805, a data frame is received and forwarded to switch engine 220. In step 810, switch engine 220 extracts the header information of the data frame to determine a suitable route path. In step 815, the data frame is encoded with an ECC code such as parity-check code or hamming code. Once the data frame is encoded, it is forwarded to a memory and stored. In step 820, when a data frame is being read out of the memory, the data frame is checked for error using the ECC code embedded therein by ECC module 710. As shown in steps 825 and 830, when a single bit error has occurred, the bit error is automatically corrected using the ECC code. In an embodiment, after the bit error correction, tables 222, 224, and 226 are instructed to mark the lookup entry for the data frame as a valid entry. However, when a double bit error has occurred, the data frame is discarded as shown in steps 835 and 840. In this scenario, tables 222, 224, and 226 are instructed to mark the lookup entry for the data frame as an invalid entry. Steps 825-840 are actually performed by ECC module 710, but are shown separately for better illustration.

In step 840, the ECC processed data frame is forwarded to switch engine. In embodiment, no further processing is required and the data frame is forwarded to the switch fabric. In an alternative embodiment, the data frame is examined by QoS module 228 by examining the FCS portion of the data frame. Once QoS module verifies that there is no error from the FCS analysis, the data frame is forwarded to the switch fabric. Although the process flow is described in the order shown, it should be understood that the process flow may have a different order. For example, step 840 may be performed prior to step 820.

Figure 9:
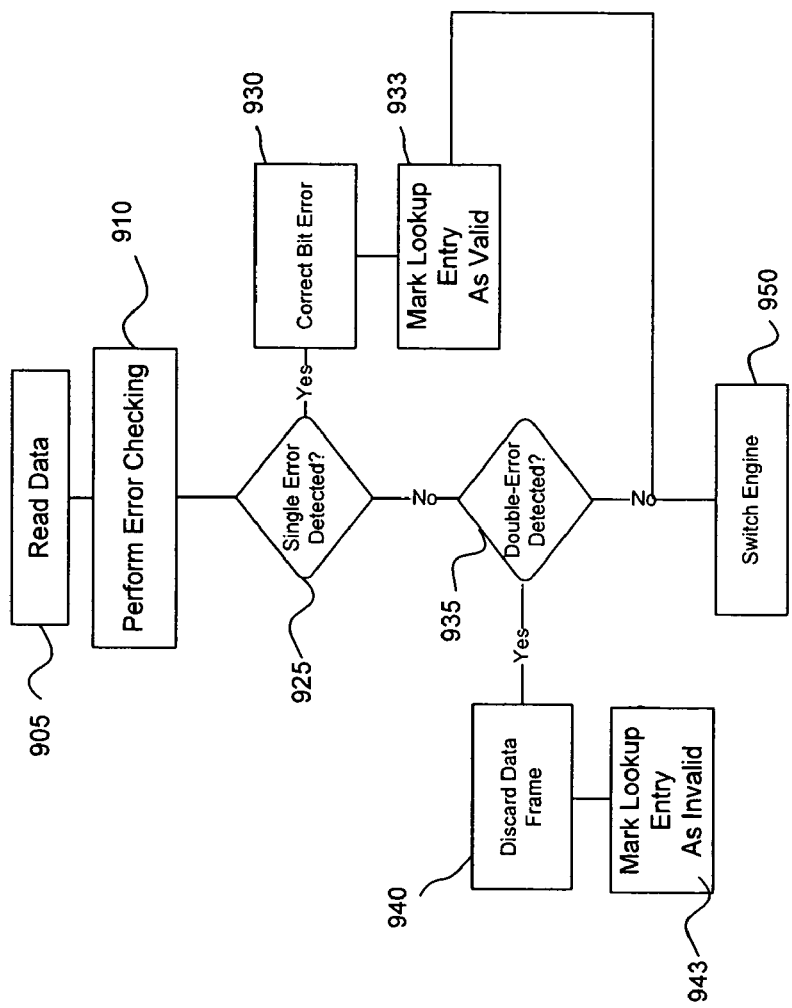
FIG. 9 illustrates a process flow diagram according to an embodiment of the present invention.

FIG. 9 illustrates a process flow according to another embodiment of the present invention. In step 905, a data frame is received by the input buffer 210 and forwarded to QoS module 228. In step 910, ECC 750 analyzes the ECC code embedded within the data frame. As shown in steps 925 and 930, when a single bit error has occurred, the bit error is automatically corrected using the ECC code. In step 933, after the single bit error is corrected, tables 222, 224, and 226 may mark the lookup entry as valid. This allows the address lookup and routing process to continue. When a double bit error has occurred, the data frame is discarded as shown in steps 935 and 940. In step 943, tables 222, 224, and 226 mark the lookup entry as invalid and the lookup process is abandoned.

Although the process flows shown in FIG. 8 and FIG. 9 are described separately, switch 700 may be configured to perform both of the processes. Alternatively, switch 700 may be configured to perform a part or all of both processes.

It should be understood by one skilled in the art that the invention may be implemented on other layers such as layer 3 and 4, even though the invention has been described on a layer 2 switch,

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

We claim:

1. A data switch comprising:
    an input port to receive data frames;
    a switch engine to examine a header information of one of the received data frames to determine a route path for the data frame;
    an error encoder to encode the data frame with an error correction code;
    a memory to store the encoded data frame; and
    an error checking and correcting (ECC) module to analyze the stored data frame for an error using the error correction code embedded in the stored data frame, wherein the ECC module is configured to cause the switch engine to route or discard the stored data frame based on a result of the error analysis.

2. The data switch of claim 1, wherein the error encoder is configured to encode the data frame with a code algorithm including one of the following parity-check code, hamming code, or Reed-Solomon code.

3. The data switch of claim 2, wherein the hamming code has a hamming distance of at least 4.

4. The data switch of claim 1, wherein the switch engine is further configured to examine a frame check sequence information of the data frame to determine whether the data frame is received with an error by the input port.

5. The data switch of claim 4, wherein the switch engine is configured to discard the data frame if an error is found in the data frame.

6. The data switch of claim 1, wherein the ECC module is configured to cause the switch engine to discard the data frame if an error is found in the data frame as a result of the ECC analysis.

7. The data switch of claim 1, wherein the ECC module is configured to correct a bit error in the data frame if a single bit error is detected as a result of the analysis and to cause the switch engine to route the data frame after the bit error is corrected.

8. The data switch of claim 7, wherein the ECC module further is configured to detect a double-bit error and to cause the switch engine to discard the data frame.

9. The data switch of claim 1, wherein the data switch is an store-and-forward switch.

10. The data switch of claim 1, wherein the data switch an adaptive cut-through switch.

11. The data switch of claim 1, wherein the data switch is a layer 3 router.

12. A network switch comprising:
an input port to receive a data frame;
an error encoder to encode the data frame with an error correction code prior to storing the data frame;
a memory to store the encoded data frame;
an error checking and correcting (ECC) module to analyze the stored data frame for an error using the error correction code encoded in the data frame, wherein the ECC module is configured to flag the data frame based on a result of the error analysis; and
a switch engine to examine a header information of the received data frame to determine a route path for the data frame, and to examine a frame check sequence (FCS) information of the data frame for error in the data frame, wherein the switch engine is configured to route or discard the data frame based on the FCS examination and the flag of the data frame.

13. The network switch of claim 12, wherein the switch engine is configured to discard the data frame if an error is found by the FCS examination.

14. The network switch of claim 12, wherein the ECC module is configured to flag the data frame for discarding if an error is found as a result of the ECC analysis.

15. The network switch of claim 14, wherein the switch engine is configured to discard the data frame if the data frame is flagged for discarding.

16. The network switch of claim 12, wherein the switch engine is configured to forward the data frame to the determined route path if no error is found in the FCS examination and ECC analysis.

17. The network switch of claim 12, wherein the ECC module is configured to correct a bit error in the data frame if a single bit error is detected as a result of the ECC analysis.

18. The network switch of claim 12, wherein the ECC module further is configured to detect a double-bit error and to cause the switch engine to discard the data frame.

19. A method for data switching, comprising:
receiving a data frame;
examining a header information of the data frame;
determining a route path for the data frame;
encoding the data frame with an error checking and correcting (ECC) code prior to storing the data frame;
storing the encoded data frame in a memory;
analyzing the stored data frame for an error using the ECC code encoded in the data frame; and
switching the data frame based on a result of the ECC code analysis of the data frame;
wherein the steps of receiving, examining, determining, encoding, analyzing, and switching are performed by a data switch.

20. The method of claim 19, wherein the encoding of the data frame is done with a code algorithm including one of the following parity-check code, hamming code, or Reed-Solomon code.

21. The method of claim 20, wherein the hamming code has a hamming distance of at least 4.

22. The method of claim 20 further comprising:
examining a frame check sequence (FSC) information of the data frame to determine whether the data frame is received with an error.

23. The method of claim 22, further comprising:
discarding the data frame if an error is found in the data frame.

24. The method of claim 19, wherein the switching of the data frame further comprising:
discarding the data frame if there is an error in the data frame as a result of the ECC code analysis.

25. The method of claim 22, wherein the switching of the data frame further comprising:
forwarding the data frame to the determined route path if no error is found in the FCS examination and ECC code analysis.

26. The method of claim 19, further comprising:
correcting a bit error in the data frame if a single bit error is detected as a result of the ECC code analysis.

27. The method of claim 19, further comprising:
discarding the data frame if ECC code analysis shows a double-bit error.

28. A network switch comprising:
an input port configured to receive a data frame embedded with an error checking and correcting (ECC) code;
an address lookup & routing (ALR) module configured to receive a header of the data frame and to perform an address lookup & routing procedure; and
an ECC decoder configured to receive the data frame and to decode the data frame using the embedded ECC code to correct a bit error in the data frame if a single bit error is detected, and to flag the data frame as invalid if a 2-bit error or more is detected and otherwise flag the data frame as valid;
wherein the ALR module is configured to flag the header of the data frame based on the flag of the data frame and to abandon the address lookup & routing procedure for all invalid headers.

29. A method for data switching, comprising:
receiving a data frame embedded with an error checking and correction (ECC) code;
forwarding a header of the data frame to an address lookup & routing module (ARL);
analyzing the received data frame for an error using the embedded ECC code; and
flagging the data frame as invalid if a 2-bit error or more is detected, otherwise flagging the data frame as valid;
abandoning an address lookup & routing procedure on the header if the data frame is invalid; and
switching the valid data frame;
wherein the steps of receiving, forwarding, analyzing, flagging, abandoning, and switching are performed by a network switch.

* * * * *